United States Patent
Stender

(10) Patent No.: US 6,196,640 B1
(45) Date of Patent: Mar. 6, 2001

(54) METHOD FOR COORDINATING BRAKING FORCES BETWEEN CONNECTED UNITS OF A VEHICLE TRAIN

(75) Inventor: Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/181,626

(22) Filed: Oct. 28, 1998

(30) Foreign Application Priority Data

Jun. 11, 1997  (DD) ............................................. 197 49 015

(51) Int. Cl.$^7$ ....................................................... B60T 13/00
(52) U.S. Cl. .................................. 303/7; 303/186; 303/123
(58) Field of Search ............................ 303/7, 9.62, 123, 303/128, 129, 138, 167, 177, 186

(56) References Cited

U.S. PATENT DOCUMENTS

| | | | |
|---|---|---|---|
| 3,657,601 | * | 4/1972 | Darrow .............................. 188/181 A |
| 3,960,410 | * | 6/1976 | Leitz et al. ............................. 303/139 |
| 4,070,562 | * | 1/1978 | Kuno et al. ............................ 303/138 |
| 4,505,520 | | 3/1985 | Maehara . |
| 4,943,123 | | 7/1990 | Takeda et al. . |
| 5,333,940 | * | 8/1994 | Topfer ....................................... 303/7 |
| 5,615,931 | | 4/1997 | Stumpe et al. . |

FOREIGN PATENT DOCUMENTS

| | | |
|---|---|---|
| 2212618 | 9/1973 | (DE) . |
| 3207793 | 9/1983 | (DE) . |
| 4405709 | 8/1995 | (DE) . |
| 4438222 | 5/1996 | (DE) . |
| 0357983 | 9/1990 | (EP) . |
| 0532863 | 3/1993 | (EP) . |
| 0697314 | 2/1996 | (EP) . |
| 2125499 | 3/1984 | (GB) . |

\* cited by examiner

Primary Examiner—Robert J. Oberleitner
Assistant Examiner—Robert A. Siconolfi
(74) Attorney, Agent, or Firm—Proskauer Rose LLP

(57) ABSTRACT

A method for the coordination of braking forces between two attached units of a vehicle train, for example a towing vehicle and a trailer, uses slip-encumbered wheel speed signals to calculate a value representing the difference between the braking forces exerted on the two units of the vehicle train. Such wheel speed signals are normally edited into speed signals by electronic control systems located in each of the units of the vehicle train through signal processing. The speed signals thus obtained are then utilized for various control and regulating processes. During the processing of the signals received from the different units of the vehicle train, time delays occur, primarily due to transmission of the signals and/or different signal editing processes. To overcome errors due to this time delay effect, the method in accordance with the invention determines a differential value representative of the difference in braking forces using derivatives over time of the speed signals rather that the speed signals themselves. The described method is preferably used in towing vehicle/trailer arrangements equipped with electronically controlled braking systems.

10 Claims, 3 Drawing Sheets

METHOD FOR COORDINATING BRAKING FORCES BETWEEN CONNECTED UNITS OF A VEHICLE TRAIN

BACKGROUND OF THE INVENTION

The present invention relates to a method for coordinating braking forces between two connected units forming a vehicle train.

A method for providing coordination of braking forces in connected units of a vehicle train is disclosed for example in EP 0 532 863 B1 (U.S. Pat. No. 5,333,940). The method disclosed therein is directed to use with a towing vehicle and a trailer which together constitute two connected units in a vehicle train subjectable to independent braking forces. The known method attempts to obtain even distribution of braking force through adaptive influence exerted upon the trailer braking pressure which generates the braking force in the trailer controlled from the towing vehicle.

Control of the trailer braking pressure is based upon slip-encumbered wheel speed signals which are obtained from wheels on both units of the vehicle train and transmitted for central evaluation within the towing vehicle as speed signals corresponding to a particular unit of the vehicle train.

The different braking forces on the slipping wheels, analysis of which provides a basis for adaptively influencing the trailer braking pressure, are assumed by applying a physical law relating braking force and a difference between the various measured slip-encumbered wheel signals. In accordance with the known method, the braking pressure of the trailer is adaptively influenced when a difference is detected between the speed signals of the various wheels of a unit or between the speed signals of the towing vehicle and the trailer calculated from same, in such manner that the difference between the speed signals is minimized, and braking forces are thereby divided nearly equally between the towing vehicle and the trailer.

The above described method requires that at least one speed signal from each unit of the vehicle train, i.e. the towing vehicle and the trailer, be transmitted to an electronic control device which centrally evaluates the speed signals and effects adaptive influence of the trailer braking pressure to properly coordinate the braking forces.

Since the vehicle train may at times be very large, a substantial time offset may occur between the speed signals, caused for example by running times during signal transmission from the trailer to the towing vehicle, or due to different filtering processes of the wheel speed signals in the units of the vehicle train.

As a consequence, practice of the known method may at times result in insufficient coordination of the braking forces between the towing vehicle and the trailer, resulting in unequal brake lining wear for different wheels, extended braking distance and, under certain conditions, hazardous braking.

It is therefore an object of the invention to provide a method for the coordination of braking forces between two connected units which comprise a vehicle train, in which precise control is made possible even when speed signals of different kinds are used.

SUMMARY OF THE INVENTION

In accordance with these and other objects of the invention, there is provided a method for the coordination of braking forces between two units connected to one another in a vehicle train, for example a towing vehicle and a trailer attached thereto. Each of the two units includes a braking system which produces a braking force when imparted a braking control value. The inventive method imparts the braking system of each of the two units with a braking control value having a value based upon a starting value upon start-up of the towing vehicle. An additional braking control value for transmission between units of the vehicle train is also imparted a value. Slip-encumbered wheel signals are obtained from wheels located on each of the two units, and a unit speed for each of the two units is derived from the slip-encumbered wheel signals corresponding to a respective one of the two units. For each of the two units a derivative with respect to time of the unit speed is determined. A differential value is then calculated during at least a time segment of a brake application, the differential value being a difference between the derivatives over time of each of the units. The braking control value for each unit is then altered on the condition that a calculated value of the differential value lies in a range defined by a predetermined lower limit and a predetermined upper limit.

In addition to finding application in coordination of braking forces between a towing vehicle and a trailer, the invention is also useful in coordinating braking forces within each of the individual units, i.e. the towing vehicle and/or the trailer itself. Depending on the particular application of the invention, the units of the vehicle train are therefore understood to be the combination of the towing vehicle and the trailer, or alternatively the different axle groups within each of the towing vehicle and/or the trailer. Multiple application of the invention within the vehicle train is furthermore deemed advantageous.

The invention provides the advantage that any combination of vehicle units can be coupled together to form a vehicle train, even units produced by different manufacturers and equipped with components, such as for example braking systems and/or wheel speed detection means, which operate differently from one another.

By utilizing a control program which involves very few computing steps and which can be executed by a microprocessor, the method in accordance with the invention may be practiced in a simple manner. Furthermore, the invention advantageously permits use of the wheel speed sensing means already present in vehicle trains of newer construction for the detection of the slip-encumbered wheel speed signals. By obviating installation of additional sensing means, the method in accordance with the invention may be practiced economically.

When a significant difference occurs between the braking forces of the units of the vehicle train, coordination of the braking forces is implemented by alteration of braking control values which are normally provided to produce the braking forces. Such braking control values include, for example, pneumatic or hydraulic braking pressures, or alternatively electrical signals.

In order to coordinate the braking forces it is possible, in principle, to modify the braking control values corresponding to the two units of the vehicle train, such that one braking control value is reduced while the value of the remaining unit is increased to an equal extent. In an advantageous embodiment in accordance with the invention, however, only one of the two control values is changed relative to the other braking control value, the latter being set for a chosen unit of the vehicle train designated as a reference unit. As a result, the computations required to carry out the method in accordance with the invention are minimized.

In accordance with an embodiment of the invention, a magnitude is used as a measure of the difference between braking forces present on the two units of the vehicle train, referred to herein as a "differential value". The differential value represents a computation magnitude which has no immediate relationship with physical force measured in Newtons.

In a particularly advantageous embodiment, the differential value is determined either as an absolute difference, i.e., a difference between the derivatives over time of the vehicle unit speeds, or alternatively as a relative difference, i.e., as a quotient of the derivatives over time of the vehicle unit speeds. This feature permits the method to be compatible with a wide range of different type control devices, for example, various microprocessors. Through selection of a calculating step specifically suited to the particular microprocessor being used for determination of the differential value, i.e., a step involving either subtraction or division, the method can be optimally adapted to the individual performance capabilities of the microprocessor, thereby maximizing efficiency by shortening computing time.

In a further advantageous embodiment in accordance with the invention, the differential value is determined in a stationary braking phase, i.e. a phase during which the braking control value of the reference unit of the vehicle train remains constant or changes only minimally. Since possible changes or gradients of the braking control value need not be taken into account, the required computations in carrying out the method are thereby advantageously further minimized.

In accordance with yet another advantageous embodiment of the invention, modification of the braking control value is carried out in a step-by-step manner during one or more brake applications. By using several steps to adjust the braking control value, and if necessary several brake applications, the size of the individual steps may be reduced to relatively small incremental adjustments. As a result, violent, jolting changes in braking force are advantageously avoided. The units of the vehicle are protected from unevenly distributed braking forces while traveling comfort is concomitantly maintained.

In a particularly advantageous embodiment in accordance with the invention, the ratio between the respective braking control values set for the reference unit and for the secondary unit of the vehicle train during the course of a brake application is calculated as a braking control factor, and is stored for later utilization. In this manner, it is possible to correct the starting value of the braking control value used at the start of a brake application for the secondary unit of the vehicle train by use of the braking control factor, so that in the course of several brake applications optimal settings for the braking control values can be approximated, thereby allowing early coordination of braking forces at the beginning of brake application.

In vehicle trains in which the units thereof remain connected the each other for extended periods, the above approach achieves good coordination of braking forces during the first brake application after travel is initiated. When the units of a vehicle train are exchanged, for example following connection of another trailer to the towing vehicle, a new determination of the braking control factor then occurs automatically in the course of several brake applications.

In practice, differently structured sensing means may be utilized for obtaining the speed signals which are then processed by electronic control devices of different types within the units of the vehicle train. This presents a problem in addition to the time offset issue addressed above with regard to the known method of braking force coordination in which the signals are processed in a central control device. In particular, the signals may show different scale systems, i.e. a different numerical representation of the wheel speed values. Such different scalings can be also be caused, for example, by a difference in tire wear between the various wheels of the units of the vehicle train.

Therefore, in another advantageous embodiment of the invention addressing this potential problem, a correction factor is calculated from the vehicle unit speeds during non-braked travel of the vehicle train, which is used during braking to correct the derivatives over time of the vehicle unit speeds. In this manner, different signal scalings can be compensated for in the unit vehicle speeds.

The above, and other objects, features and advantages of the present invention will become apparent from the following description read in conjunction with the accompanying drawings, in which like reference numerals designate the same elements and/or signals.

DETAILED DESCRIPTION OF THE PREFERRED EMBODIMENT

Figure 1:
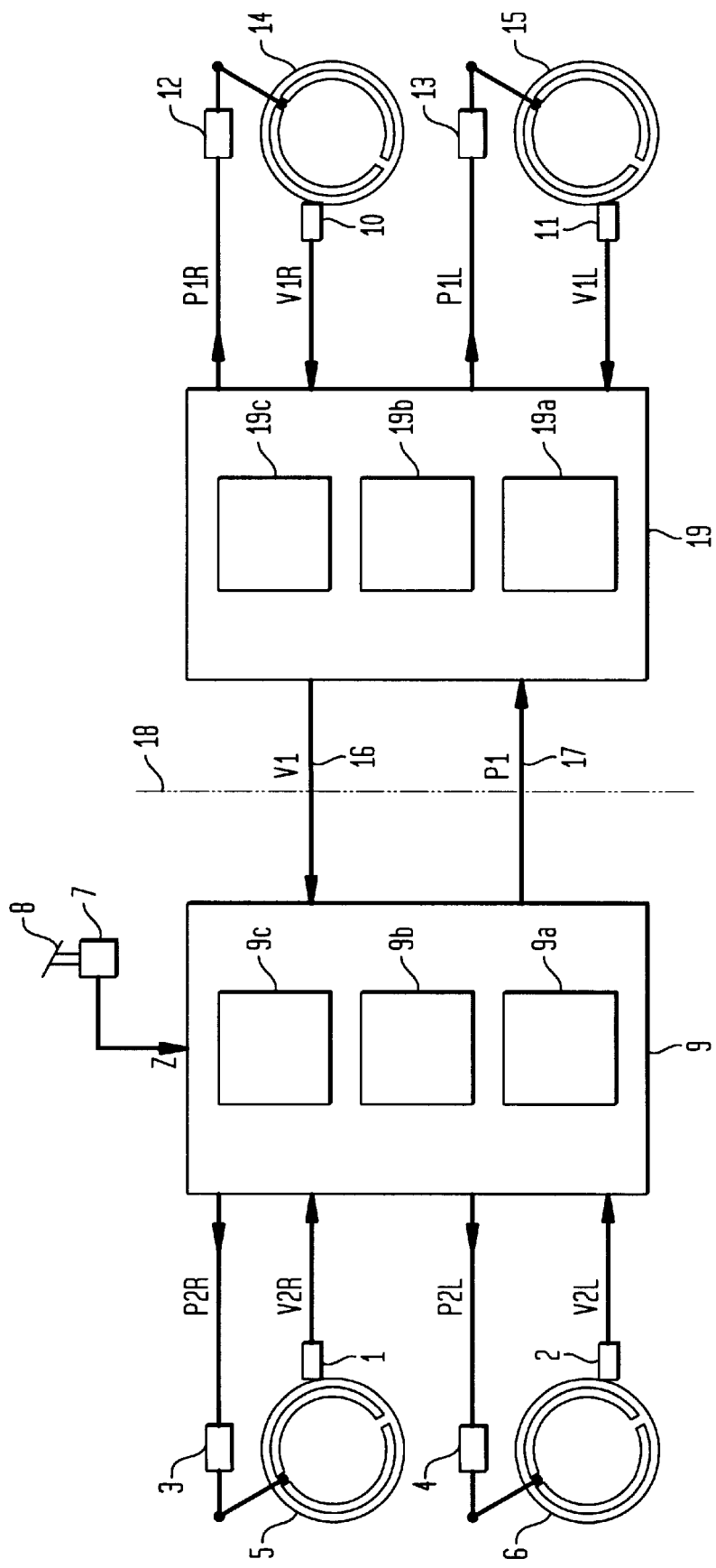
FIG. 1 is a schematic diagram of the operational components of a braking system implementing the method in accordance with an embodiment of the invention.

Referring to FIG. 1, a brake system is shown by which the method in accordance with the invention is implemented, and includes a number of external mechanical, electrical or electromechanical components designated respectively by the numerals 1, 2, 3, 4, 7, 9, 10, 11, 12, 13, 19. Signals, depicted by lines interconnecting components 1, 2, 3, 4, 7, 9, 10, 11, 12, 13, 19, are designated respectively by the reference symbols V2R, V2L, P2R, P2L, Z, V1, P1, V1R, V1L, P1R, P1L. Although depicted as connecting lines, it is to be understood that, in practice, the signals are transmitted via logical signal channels. The direction of signal flow in such logical signal channels is indicated by arrows along the respective connecting lines. Signals V2R, V2L, P2R, P2L, Z, V1, P1, V1R, V1L, P1R, P1L are advantageously in the form of digital electrical signals. The logical signal channels used to carry the digital signals are, for example, in the form of serial bus Systems. As such, the different logical signal channels according to the depiction of FIG. 1 may, in practice, alternatively be physically embodied as a single bus system or an arrangement of several bus systems to which components 1, 2, 3, 4, 7, 9, 10, 11, 12, 13, 19 are connected.

The arrangement shown in FIG. 1 exemplifies the parts of a braking system in a vehicle train comprised of a towing vehicle and a trailer connected therewith. In the figure, components and parts 1, 2, 3, 4, 5, 6, 7, 8, 9 correspond to the towing vehicle, and remaining components and parts 10, 11, 12, 13, 14, 15, 19 correspond to the trailer. The towing vehicle and the trailer are connected at least via signal channels 16, 17 to permit exchange of data therebetween. In the event the trailer is uncoupled from the towing vehicle, a separation point 18 provides means for separation of signal channels 16, 17. Separation point 18 may be provided, for example, in the form of an electrical and/or pneumatic plug-in connection.

Although FIG. 1 is directed for purposes of illustration to a towing vehicle and trailer combination, the method in accordance with the invention is also applicable for use in only one unit of the vehicle train, for example, the towing vehicle alone. In such case, it is to be understood that components 1, 2, 3, 4, 5, 6 and remaining components 10, 11, 12, 13, 14, 15 shown in FIG. 1 correspond to respective axle groups of the same towing vehicle, in particular, the front and rear axle. When the method is applied to use in a single unit, parts 9, 19, which represent different electronic control devices, can be combined into a single control device.

The braking system of FIG. 1 is an electronically controlled braking system (EBS), and includes wheel brakes 5, 6 preferably disposed on a nondriven axle of the towing vehicle, and wheel brakes 14, 15 on an axle of the trailer.

Each of brakes 5, 6, 14, 15 is provided with an actuator 3, 4, 12, 13, respectively, for actuation thereof. Actuators 3, 4, 12, 13 actuate their corresponding brakes 5, 6, 14, 15 via mechanical rod systems. Actuators 3, 4, 12, 13 are subjected to signals in the form of braking control values P1R, P1L, P2R, P2L. In order to translate a braking control value into an actuating force or actuating stroke for the wheel brake, each actuator 3, 4, 12, 13 is preferably equipped with an electronic control system for the processing of the braking control value, a pressure medium connection, and a valve connected to same for supply of the pressure medium to an adjusting cylinder. With this arrangement, the electronic control system controls the valve in such manner that the braking pressure exerted on the wheel brake corresponds to the braking control value. The pressure medium connection pf the actuator is connected to a pressure medium source (not shown), provided, for example, in the form of an air compressor and a compressed-air supply container.

A speed sensor 1, 2, 10, 11 is assigned to each wheel, connected for operation with a pole wheel (not shown) installed on the corresponding wheel. Speed sensors 1, 2, 10, 11 each transmit a signal V1R, V1L, V2R, V2L representative of the wheel speed to respective electronic control devices 9, 19 assigned to corresponding speed sensors 1, 2, 10, 11. The determination of vehicle wheel speeds has already been addressed in sufficient detail with regard to anti-lock brake systems (ABS) and is therefore not unnecessarily repeated herein.

A brake signal transmitter 7 is connected mechanically to a brake pedal 8 of the towing vehicle, which produces an additional input signal for control device 9, in the form of a deceleration command signal Z. When brake pedal 8 is actuated by a driver of the towing vehicle, brake signal transmitter 7 emits deceleration command signal Z which has a value corresponding to a vehicle deceleration desired by the driver.

Control device 9 carries out a series of control and regulating tasks in the towing vehicle. One of these tasks is actuation of wheel brakes 5, 6, 14, 15 in furtherance of the desired deceleration of the driver represented by deceleration command signal Z and as influenced by additional input signals V1, V2R, V2L, in such manner that the vehicle train is decelerated as desired and maintains a stable travel state during the braking operation. To this end, control device 9 carries out a number of processes superimposed upon each other and influencing one another, such as for example anti-lock protection (ABS) in the presence of reduced road surface friction, minimizing of brake lining wear, and coordination of braking forces between towing vehicle and trailer. The functions carried out by these processes are represented symbolically in FIG. 1 as blocks 9a, 9b, 9c respectively.

Thus, for example, braking control values P2R, P2L for the towing vehicle are determined in block 9c in coordination with input signal deceleration command signal Z by means of assignment from a stored assignment table, or by using a suitable assignment function such as known from DE 44 38 222 A1 (U.S. Pat. No. 5,615,931) which is incorporated herein by reference for the subject matter relating to the practice of such approach.

Control device 19 in the trailer functions in a similar manner to control device 9 in the towing vehicle, performing a series of control and regulating tasks in the trailer, for example, providing anti-lock protection and minimizing brake lining wear. Since the coordination of the braking forces in the described embodiment is carried out by control device 9, control device 19 does not provide such function. Instead, control device 19 performs a process by which speed signal V1, transmitted to the towing vehicle, is computed as an arithmetic mean value of speed signals V1R, V1L. In addition, braking control value P1 received from the towing vehicle is processed by control device 19 into braking control values P1R, P1L, which are imparted to actuators 12, 13. The above described processes carried out in control device 19 are represented symbolically in FIG. 1 as blocks 19a, 19b, 19c.

Figure 2:
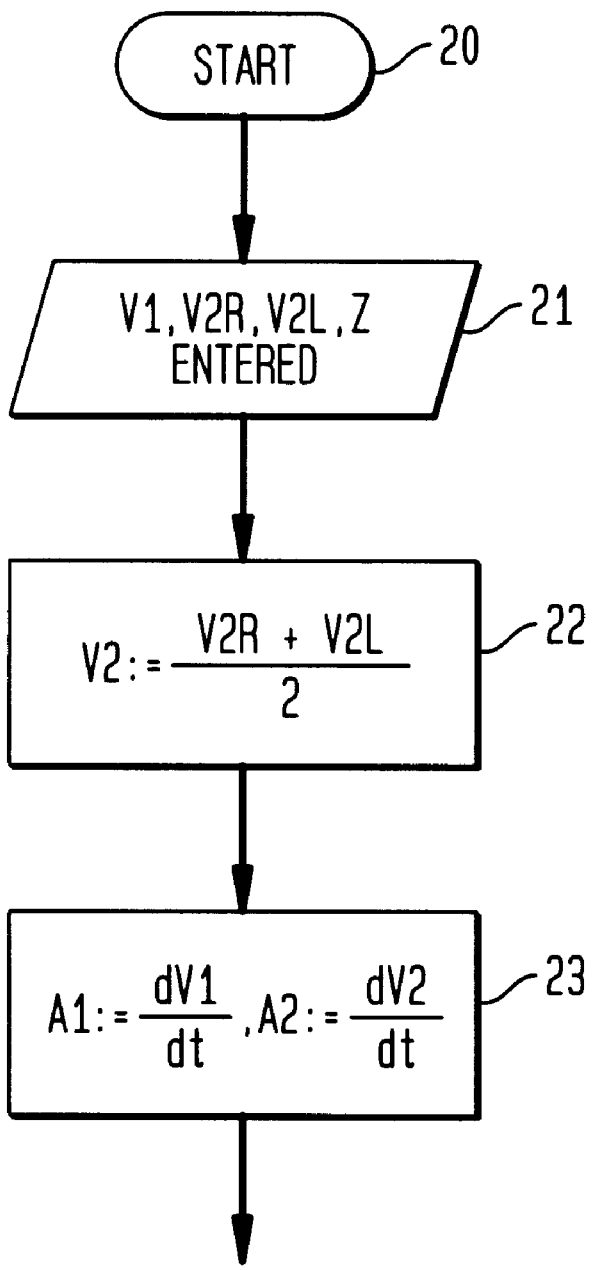
FIG. 2 is a flow chart representing a portion of the method in accordance with an embodiment of the invention.
Figure 3:
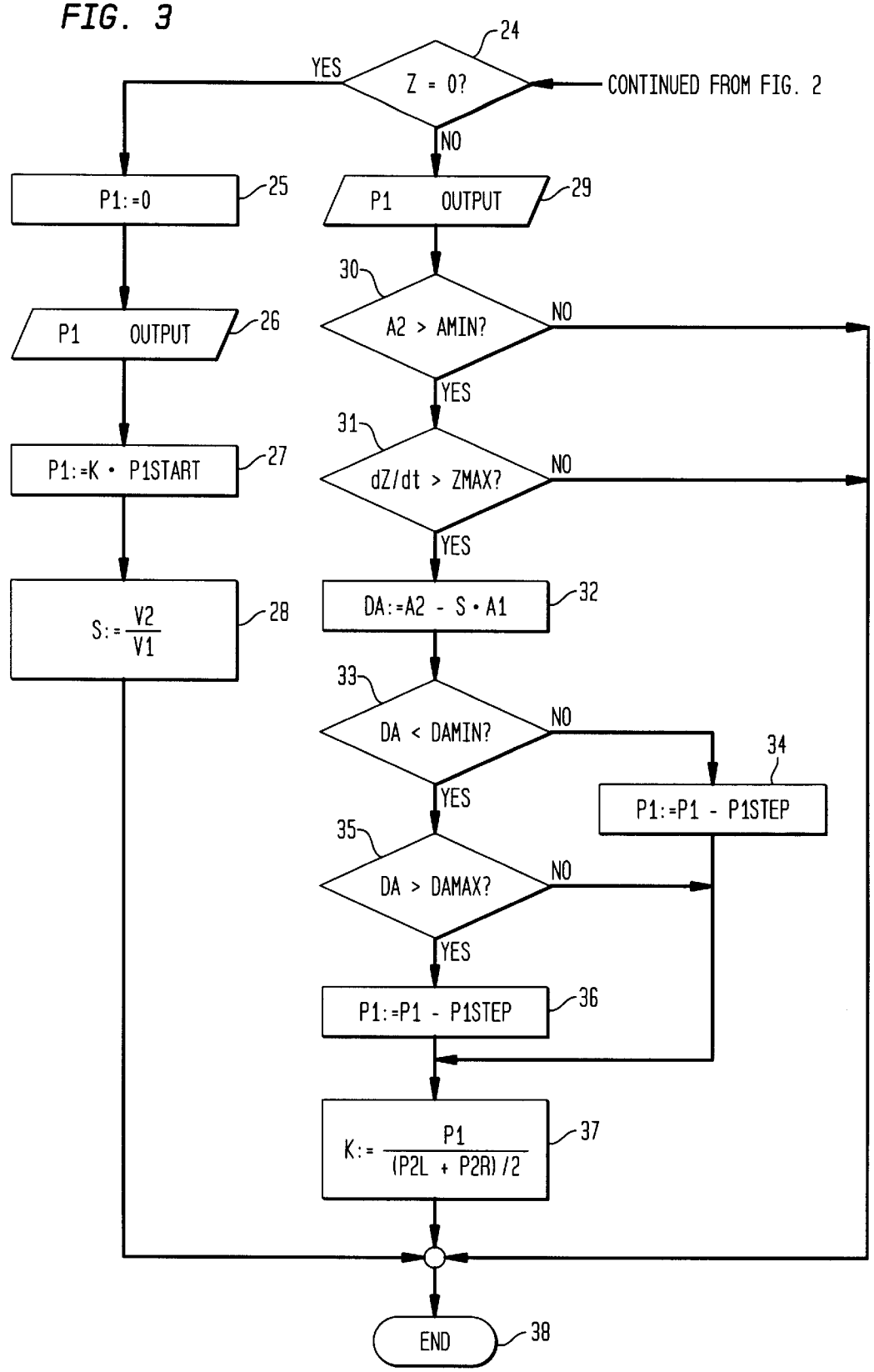
FIG. 3 is a flow chart representing a continuation of the method depicted in FIG. 2.

Turning now to FIGS. 2 and 3, one of the above processes performed by control device 9, i.e. coordination of braking forces between units of the vehicle train, is shown in further detail. The process of block 9a starts in FIG. 2 with the block designated by the numeral 20.

Signals V1, V2R, V2L, Z are entered into a downstream data transfer block 21. Speed signal V2 is then formed as the arithmetic mean value of speed signals V2R, V2L representative of the individual speeds of the non-driven wheels of the towing vehicle in a processing block 22. As a further preparatory measure, the derivatives over time of speed signals V1, V2 of the towing vehicle and of the trailer are calculated as deceleration signals A1, A2 in a processing block 23. The numerical calculation of derivatives over time in a process carried out in a microprocessor has been described sufficiently in connection with ABS electronic control devices or injection apparatuses for automobile ABS, and is therefore not repeated herein.

Turning now to FIG. 3, the above process steps are continued. A test is conducted in a decision block 24 to determine whether the driver has just then applied the brakes, as indicated by the momentary presence (Z≠0) or absence (Z=0) of deceleration command signal Z transmitted from brake transmitter 7. If no brake application was implemented by the driver, the process is continued in a processing block 25, in which braking control value P1 is set to a neutral value (in the present example 0) which is representative of a state of a non-actuated braking system. Braking control value P1 is then transmitted to a data transfer block 26, where it is then output to the other control device 19 in the trailer.

Following completion of the above steps, braking control value P1 is set to a starting value in processing block 27, which will serve as a base when brake application is initiated. In selecting the starting value, a response hysteresis in the braking signal can optionally be taken into account. The braking control value P1 for receipt by the trailer is set to the product of a starting value P1START and a braking control factor K. Braking control factor K is calculated in the course of a braking action as a relative deviation between the braking control value P1 and the mean value of braking control values P2L, P2R of the towing vehicle determined in block 9C. Therefore, in following one, or possibly several, braking actions, a suitable starting value can be determined for braking control value P1 of the trailer at the beginning of the braking action. Braking control factor K is set to a neutral value (in the present example to 1) before the first brake application.

A correction factor S is then calculated in processing block 28 as the quotient of speed signals V2, V1, where V2 is conveniently the numerator and V2 the denominator. Correction factor S is used to correct different signal scaling with speed signals V1, V2, for example caused by uneven tire wear. In determining correction factor S, speed signals V1, V2 are advantageously subjected, in a known manner, to filtering, wherein filtering with a relatively high time constant, for example 60 seconds, is used. By virtue of such filtering, it is thereby possible to equalize differences in signal scaling occurring only intermittently, for example, during turning.

The process branch representing non-braked travel of the vehicle train, the steps of which have been described above, then terminates in block 38.

When the driver of the vehicle train applies the brake (Z≠0), the program branches off at decision block 24 to a data transfer block 29 in which braking control value P1 is output, in a manner analogous to that described with regard to transfer block 26. In subsequent decision blocks 30, 31, different conditions are tested, and in the event that one of the conditions is not met, the program branches off to block 38, whereby the method ends as shown in FIG. 3. Decision block 30 tests whether the vehicle deceleration, represented as a deceleration signal A2 of the towing vehicle in the present example, exceeds a predetermined limit AMIN necessary for reliable execution of the method in accordance with the invention. Such step safeguards against unwarranted changes in braking control value P1 due to noise portions superimposed on input signals V1, V2 or A1, A2. If the test of decision block 30 is met, decision block 31 then tests whether a stationary braking phase is present at the moment of braking. A stationary braking phase is a time segment during a braking operation in which deceleration command signal Z produced in response to application of the brake by the driver does not change, or only varies at a very slow rate. For this, the derivative over time of the deceleration command signal Z is compared to a predetermined value ZMAX. Suitable values for predetermined limit AMIN and predetermined value ZMAX in blocks 30, 31 are, for example, AMIN=1 m/s$^2$ and ZMAX=0.1 bar/s.

When the conditions in decision blocks 30, 31 are met, a differential value DA is then calculated in processing block 32 as the difference between deceleration signal A2 of the towing vehicle and a deceleration signal A1 of the trailer, multiplied by correction factor S. Differential value DA provides a measurement basis for the difference between the braking forces appearing at the two units of the vehicle trains. Using correction factor S calculated during non-braked travel for speed signals V1, V2, a deviation possibly present between deceleration signals A1, A2 caused by different signal scaling is thereby compensated for.

Differential value DA is compared with a lower limit value DAMIN and an upper limit value DAMAX in decision blocks 33, 35, respectively. If differential value DA is below lower limit value DAMIN, braking control value P1 of the trailer is increased by a step P1STEP of predetermined magnitude in a processing block 34. If, on the other hand differential value DA exceeds upper limit value DAMAX, braking control value P1 is decreased by step P1STEP in a processing block 36. When differential value DA lies within the range defined by lower and upper limit values DAMIN, DAMAX, braking control value P1 is not modified. Suitable limit values are, for example, DAMIN=−0.2 m/s$^2$ and DAMAX=0.2 m/s$^2$. One percent of the total value range available for braking control value P1 is, for example, a suitable value for step P1STEP.

Braking control factor K is calculated in a processing block 37 as a quotient of braking control value P1, a value of which was possibly changed previously in blocks 34, 36, and the mean value of braking control values P2L, P2R. Such calculation may be carried out continuously during every execution of the method steps described above. Alternatively, the calculation may be performed in block 37 only once, at the end of a brake application, thereby reducing the time required by the computer to carry out the method in accordance with the invention.

Braking control factor K may be stored in a transient read/write memory (RAM). It is, however, advantageous to alternatively store braking control factor K in a non-transient memory (EEPROM) which characteristically preserves its stored contents even when the power supply to the electronic control device 9 has been shut off. As such, braking control factor K calculated from previous brake applications can be used immediately again upon start-up of the vehicle, without requiring new brake application for a determination of braking control factor K.

Following processing block 37, the method outlined in FIG. 3 ends in block 38.

Having described preferred embodiments of the invention with reference to the accompanying drawing, it is to be understood that the invention is not those precise embodiments, and that various changes and modifications may be effected therein by one skilled in the art without departing from the scope or spirit of the invention as defined in the appended claims.

What is claimed is:

1. A method for the coordination of braking forces between two units connected to one another in a vehicle train, each of the two units including a braking system which produces a braking force when imparted a braking control value, comprising the steps of:

setting a braking control value for transmission between the two units and a braking control value for the braking system of each of the two units, each said braking control value being based upon a starting value upon start-up;

obtaining slip-encumbered wheel signals from wheels located on each of the two units;

deriving a unit speed for each of the two units from said slip-encumbered wheel signals corresponding to a respective one of the two units;

determine a derivative over time for each of the two units measured as a deceleration of said unit speed for each of the two units;

calculating a differential value at least during a time segment of a brake application, said differential value being a difference between each said derivative over time; and altering said braking control value for the braking systems of at least one of the two units on condition that a calculated value of said differential value lies outside a range defined by a predetermined lower limit and a predetermined upper limit wherein one of the two units is a reference unit for the remaining second unit of the two units, the method further comprising:

decreasing said braking control value for transmission between the two units as a function of said braking control value for the braking system of said reference unit when said differential value exceeds said predetermined upper limit; and increasing said braking control value for transmission between the two units as a function of said braking control value for the braking system of said reference unit when said differential value is less than said predetermined lower limit.

2. A method according to claim 1, wherein said difference between each said derivative over time in said step of calculating a differential value is a subtractive difference, and said derivative over time corresponding to said reference unit being used as a minuend.

3. A method according to claim 1, wherein said difference between each said derivative over time in said step of calculating a differential value is a relative difference, said differential value being determined as a quotient of each said derivative over time between each said unit speed, said derivative over time of said unit speed corresponding to said reference unit being used as a dividend.

4. A method according to claim 1, wherein said differential value is determined during a stationary braking phase.

5. A method according to claim 1, wherein said step of altering said braking control value is carried out only when a vehicle deceleration represented by said derivative over time of said reference unit exceeds a predetermined minimum.

6. A method according to claim 1, wherein said step of altering said braking control value includes changing each said braking control value incrementally during the course of a brake application, each method step being carried out cyclically.

7. A method according to claim 1, wherein said step of altering said braking control value includes changing said braking control value incrementally during the course of a plurality of brake applications, each method step being carried out cyclically.

8. A method according to claim 1, further comprising:

determining a braking control factor in the course of a brake application based upon a ratio of said braking control value for transmission between the two units to said braking control value for the braking system of said reference unit; and storing said braking control factor for subsequent use.

9. A method according to claim 8, further comprising: correcting said starting value by said braking control factor.

10. A method according to claim 1, further comprising:

determining a correction factor from said unit speed of each of the two units during non-braked travel of the vehicle train; and correcting said derivative over time for at least one of the two units by said correction factor while the vehicle train is braked.

* * * * *